(12) United States Patent
Braithwaite

(10) Patent No.: US 8,457,226 B2
(45) Date of Patent: Jun. 4, 2013

(54) CREST FACTOR REDUCTION FOR OFDM COMMUNICATIONS SYSTEMS BY TRANSMITTING PHASE SHIFTED RESOURCE BLOCKS

(75) Inventor: Richard Neil Braithwaite, Orange, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 530 days.

(21) Appl. No.: 12/577,009

(22) Filed: Oct. 9, 2009

(65) Prior Publication Data

US 2010/0098139 A1 Apr. 22, 2010

Related U.S. Application Data

(60) Provisional application No. 61/195,891, filed on Oct. 10, 2008.

(51) Int. Cl.
*H04K 1/10* (2006.01)
*H04L 27/28* (2006.01)

(52) U.S. Cl.
USPC ........... 375/260; 375/267; 375/371; 370/203; 370/208

(58) Field of Classification Search
USPC ........... 375/260, 267, 295, 371; 370/203–211
See application file for complete search history.

(56) References Cited

U.S. PATENT DOCUMENTS

| 6,449,302 | B2 | 9/2002 | Hunton |
| 6,928,084 | B2 | 8/2005 | Cimini, Jr. et al. |
| 2005/0265226 | A1* | 12/2005 | Shen et al. ............ 370/210 |
| 2007/0140367 | A1* | 6/2007 | Braithwaite ............ 375/260 |
| 2007/0189334 | A1 | 8/2007 | Awad |
| 2007/0217329 | A1* | 9/2007 | Abedi ............ 370/208 |
| 2009/0011722 | A1* | 1/2009 | Kleider et al. ............ 455/101 |
| 2009/0220019 | A1* | 9/2009 | Kwon et al. ............ 375/261 |
| 2010/0034186 | A1* | 2/2010 | Zhou et al. ............ 370/344 |

FOREIGN PATENT DOCUMENTS

GB 2426420 A 11/2006

OTHER PUBLICATIONS

International Search Report and Written Opinion for Application No. PCT/US2009/060264 mailed Dec. 2, 2009.
S.H. Han and J.H. Lee, "PAPR Reduction of OFDM Signals Using a Reduced Complexity PTS Technique," IEEE Signal Processing Letters, vol. 10, No. 11, pp. 887-890, Nov. 2004.
L.J. Cimini Jr. and N.R. Sollenberger, "Peak to Average Power Ratio Reduction of an OFDM Signal Using Partial Transmit Sequences," IEEE Communications Letters, vol. 4, pp. 86-88, Mar. 2000.

(Continued)

*Primary Examiner* — Curtis Odom
(74) *Attorney, Agent, or Firm* — OC Patent Law Group

(57) ABSTRACT

In the disclosed system and method phase (and optionally amplitude) shifts are applied at an OFDM transmitter to resource blocks within a given slot to implement Crest Factor Reduction (CFR). The phase shifts may differ between resource blocks and are selected to reduce the peaks in the OFDM waveform. The resource block phase shifts do not affect the demodulation process when the equalization at the receiver is performed on individual blocks separately. As a result, the crest factor reduction is achieved without increasing the EVM or BER in the received signal. In addition, a computational efficient algorithm for determining the resource block phase shifts needed for CFR is disclosed.

12 Claims, 10 Drawing Sheets

OTHER PUBLICATIONS

C.L. Wang and Y. Ouyang, "Low-Complexity Selected Mapping Schemes for Peak to Average Power Ratio Reduction in OFDM Systems," IEEE Trans. Signal Processing, vol. 53, No. 12, pp. 4652-4660, Dec. 2005.

3GPP: Technical Specification Group Radio Access Network; E-UTRA; Physical Channels and Modulation, 3GPP TS 36.211 V8.3.0, May 2008.

S. Hosokawa, S. Ohno, K.D. Teo, and T. Hinamoto, "Pilot tone design for peak-to-average power ratio reduction in OFDM," IEEE Int. Sym. Circuits and Systems, ISCAS 2005, May 23-26, 2005, pp. 6014-6017.

Y.J. Kou, W.S. Lu, and A. Antoniou, "Peak-to-average power reduction algorithms for OFDM systems via constellation extension," IEEE Int. Sym. Circuits and Systems, ISCAS 2005, May 23-26, 2005, pp. 2615-2618.

A. Alavi and C. Tellambura, "PAPR Reduction of OFDM Signals using partial transmit sequence: an optimal approach using sphere decoding," IEEE Communications Letters, vol. 9, No. 11, pp. 982-984, Nov. 2005.

\* cited by examiner

CREST FACTOR REDUCTION FOR OFDM COMMUNICATIONS SYSTEMS BY TRANSMITTING PHASE SHIFTED RESOURCE BLOCKS

RELATED APPLICATION INFORMATION

The present application claims priority under 35 U.S.C. Section 119(e) to U.S. Provisional Patent Application Ser. No. 61/195,891, filed Oct. 10, 2008, the disclosure of which is incorporated hereby by reference in its entirety.

BACKGROUND OF THE INVENTION

1. Field of the Invention

The present invention relates to wireless RF communications systems and related methods. More particularly, the present invention relates to wireless RF communications systems and related methods between cellular base stations and user equipment.

2. Description of the Prior Art and Related Background Information

Achieving high data transfer rates with good signal quality is a primary goal of modern wireless communications systems. Orthogonal Frequency Division Multiplex (OFDM—also referred to as Orthogonal Frequency Division Multiple access) modulation is an approach which uses the parallel transmission of multiple orthogonal sub-carriers to achieve high data transfer rates. One current example of a global wireless communications standard using OFDM is the LTE (Long Term Evolution) standard. The down-link waveform used in LTE is based on an OFDM format which, like most OFDM waveforms, can have a large peak-to-average power ratio (PAPR).

As noted above, the LTE waveform can have a high peak to average power ratio. Even though all modulation symbols assigned to the sub-carriers have the same average power, the magnitude of the down-link LTE waveform varies significantly in the time domain. This is due to the IFFT operation that forms each time sample from a sum of random phase variables. Phase alignment of sub-carriers results in large peaks in the time domain. Large peaks cause problems because the power amplifiers become less efficient as the peak-to-average power ratio (PAPR) of the RF signal increases. In addition, the finite dynamic range of digital-to-analog converters (DACs) place limits on the PAPR. As a result, it is desirable to limit the PAPR to allow for a more efficient design of the transmitter. This process is referred to as crest factor reduction (CFR). Usually crest factor reduction introduces in-band errors that increase the error vector magnitude (EVM) and bit error rate (BER) of the demodulated signal at the receiver.

CFR can be accomplished in various manners. The direct method is to clip peaks exceeding a specified level. This has the effect of moving the complex-valued symbols from their assigned constellation positions. The difference between the actual and assigned position in the IQ space is referred to as the "constellation error" and is measured using the error vector magnitude (EVM). Clipping tends to distribute the constellation error over the all the available sub-carriers. This can be problematic for LTE if the P-SCH, S-SCH, and reference signals are degraded. High order constellations, such as 64QAM, are especially sensitive to EVM and therefore this technique has very limited results.

Another class of methods for CFR uses some of the sub-carriers as peak reducers. This includes "tone reservation." Once a peak is detected in the time domain, the phases of the reserved sub-carriers are selected to reduce the peak. This results in lost bandwidth because fewer sub-carriers are available from transmitting data. Information regarding the active data sub-carriers must be sent to the receiver.

Another method for CFR is to alter the constellation so that the mapping between data bits and Complex-valued modulation symbols is not unique. This is referred to as "constellation extension." Data bits are mapped to two constellation positions so that $c_{IQ} = -c_{IQ}$ where $c_{IQ}$ is the complex-valued modulation symbol. The downside of this approach is that one bit is lost in the constellation mapping which reduces the throughput for tile QPSK, 16-QAM, and 64-QAM to ½, ¾, and ⅚ of the original value, respectively.

Other methods for CFR attempt to randomize the phase of the sub-carriers. These include "partial transmit sequence" (PTS) and "selective mapping" (SLM). The sub-carriers are multiplied by a set of different phase vectors producing a set of potential time sequences. The time sequence with the lowest PAPR is transmitted. The disadvantage of such approaches, typically, is that the information regarding the phase vector used must be sent to the receiver to allow demodulation.

SUMMARY OF THE INVENTION

In a first aspect the present invention provides a method for transmitting signals having reduced peak to average power in an orthogonal frequency division multiplex wireless communication system. The method comprises dividing a signal to be transmitted into resource blocks, wherein each resource block includes plural sub-carriers and plural reference signals, applying orthogonal frequency division multiplex modulation to the resource blocks, and separately applying a phase shift to individual resource blocks to reduce the peak to average power of the modulated signal. The method further comprises transmitting plural resource blocks, receiving the plural resource blocks, and demodulating the resource blocks employing the reference signals within each resource block to remove the phase shift individually for each phase shifted resource block.

In another aspect the present invention provides a method for reducing peak to average power in an orthogonal frequency division multiplex (ODFM) wireless transmission system. The method comprises receiving an ODFM signal to be transmitted, the signal being grouped into resource blocks, wherein each resource block includes a reference signal, selectively determining a phase shift for individual resource blocks to reduce the peak to average power of the modulated signal, and applying the phase shifts to individual resource blocks. Selectively determining a phase shift comprises limiting the number of possible phase shifts to reduce the search space and performing an optimization search of the reduced search space to determine a desired phase shift.

In another aspect the present invention provides an orthogonal frequency division multiplex (OFDM) wireless transmission system. The system comprises a modulation block for receiving and OFDM modulating a data signal, a resource element block providing the modulated signals in resource blocks each comprising plural sub-carriers and plural reference signals, and a crest factor reduction block for applying phase shifts individually to separate resource blocks to reduce the peak to average power of the signals and providing the peak reduced signals for transmission.

Further features and advantages of the invention will be appreciated from the following detailed description of the invention.

DETAILED DESCRIPTION OF THE DRAWINGS

Figure 1:
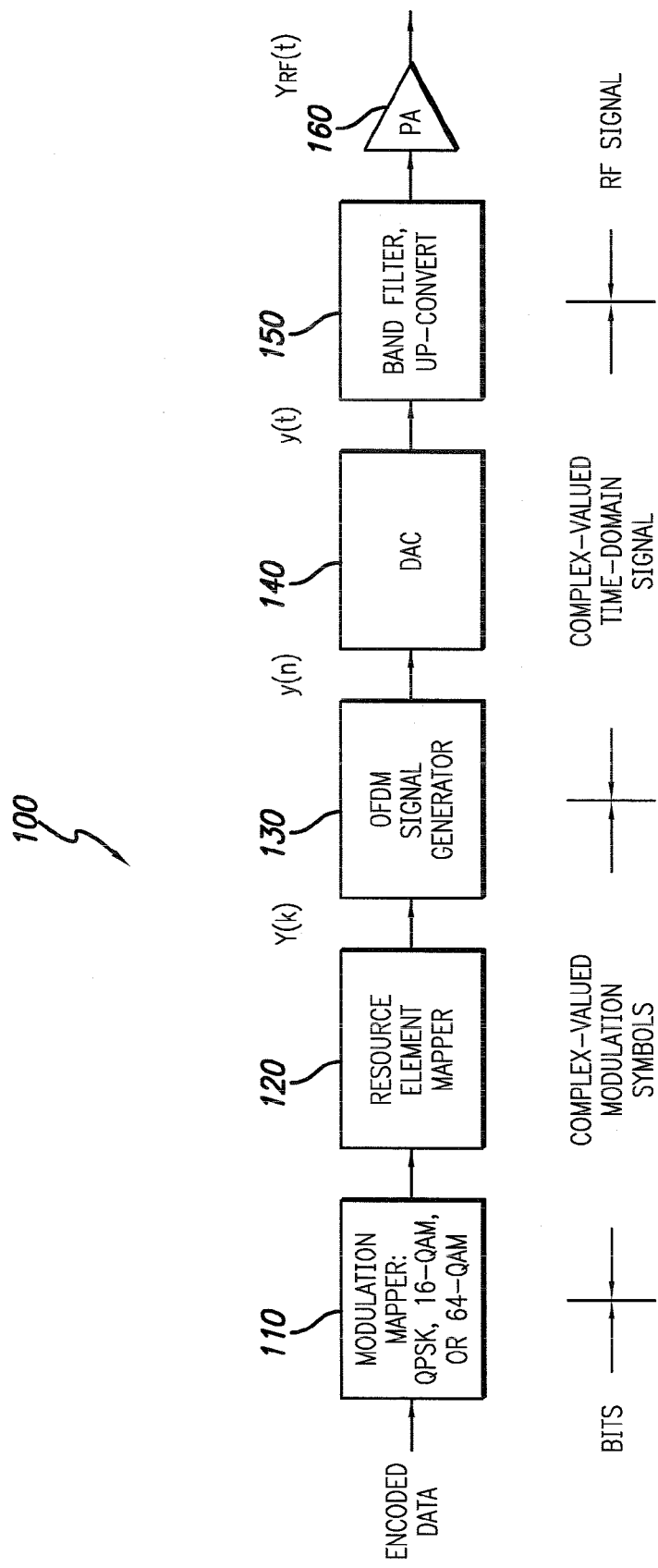
FIG. 1 is a schematic drawing of a LTE down-link transmitter for a one antenna port system.
Figure 2:
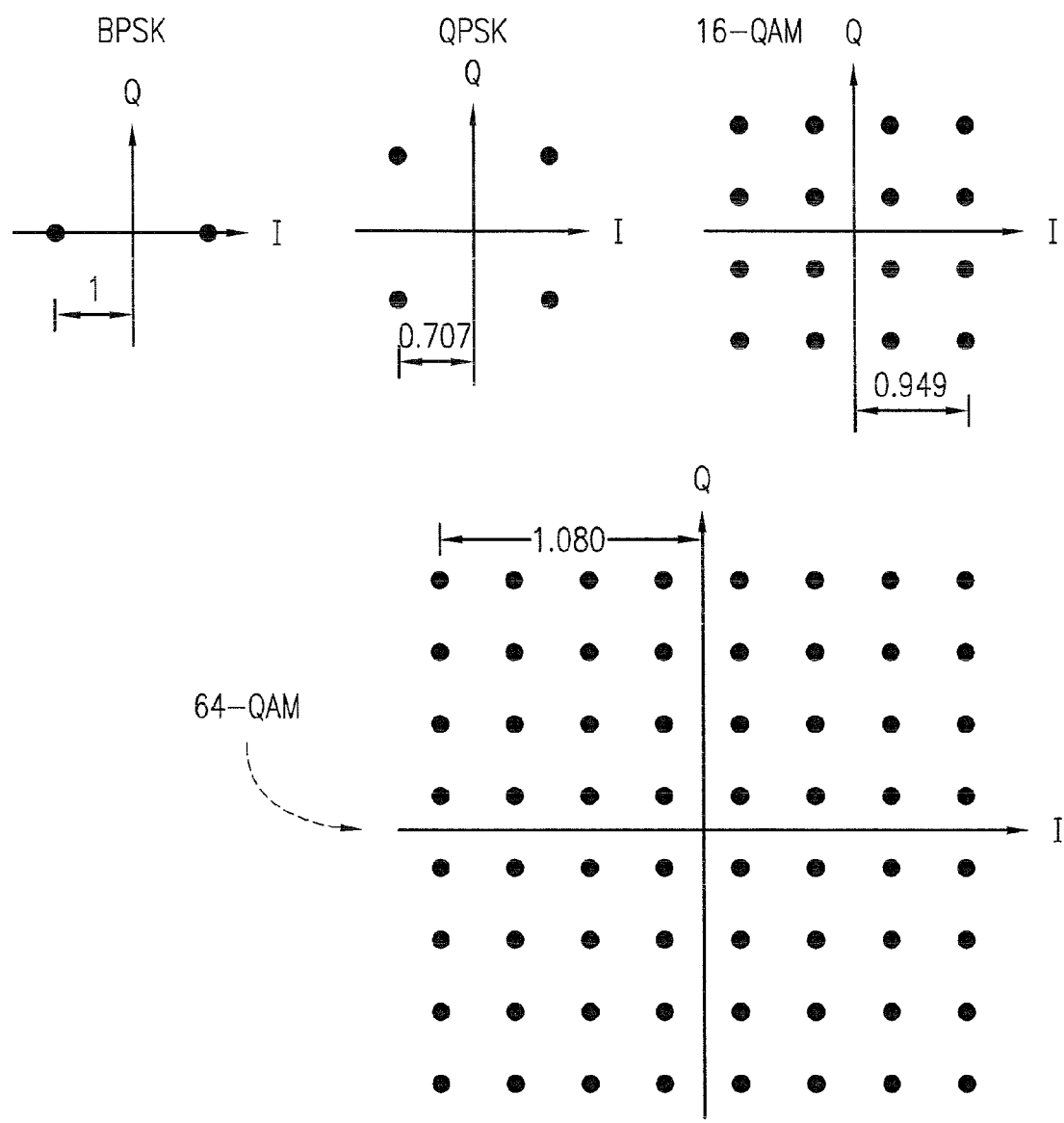
FIG. 2 is a schematic drawing of constellation maps for BPSK, QPSK, 16-QAM, and 64-QAM encoding for a LTE down-link transmitter.
Figure 3:
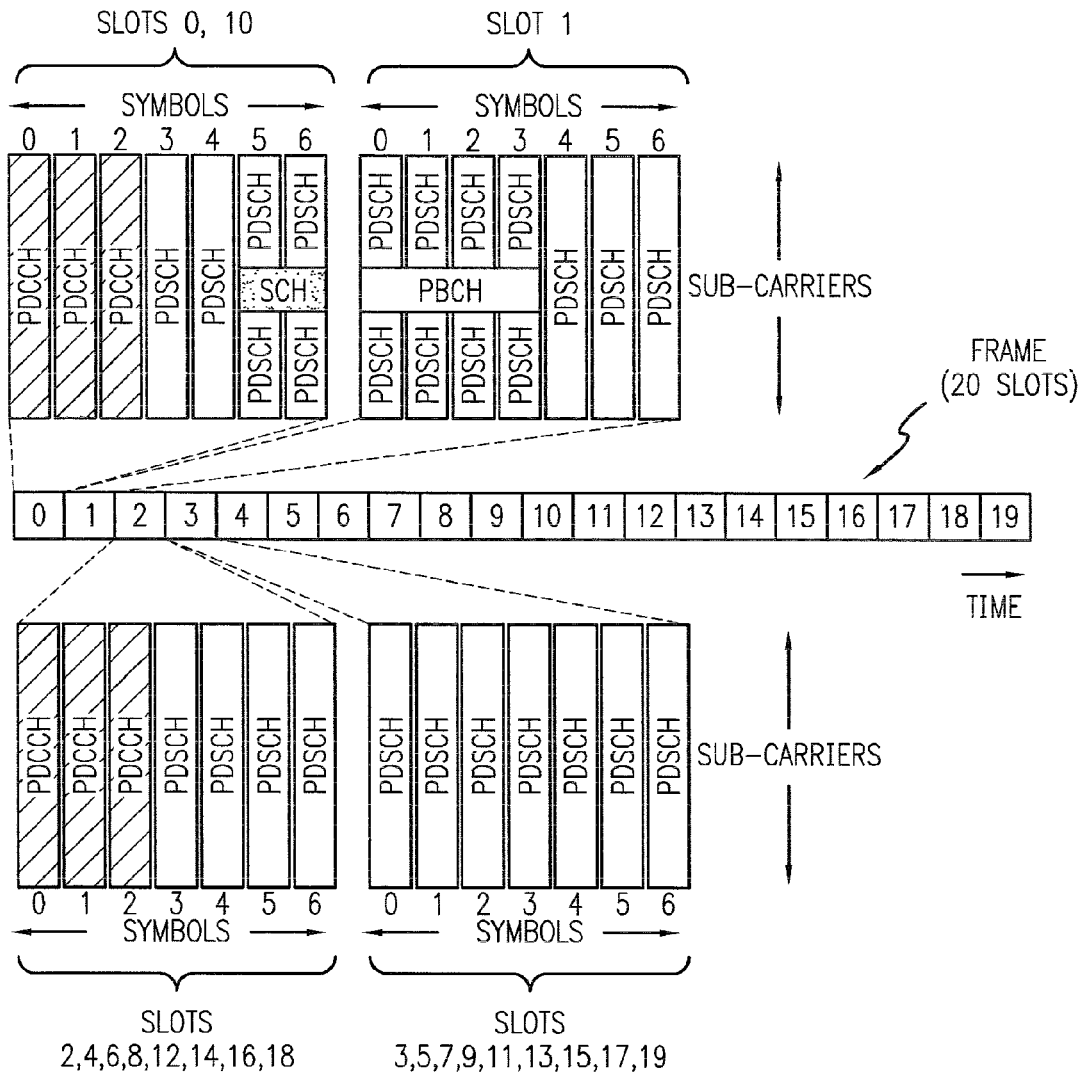

FIG. 3 is a schematic drawing of a LTE downlink FS1 frame and channel composition of the 20 slots. (The SCH channel shown comprises the S-SCH on symbol 5 and the P-SCH on symbol 6.)

Figure 4:
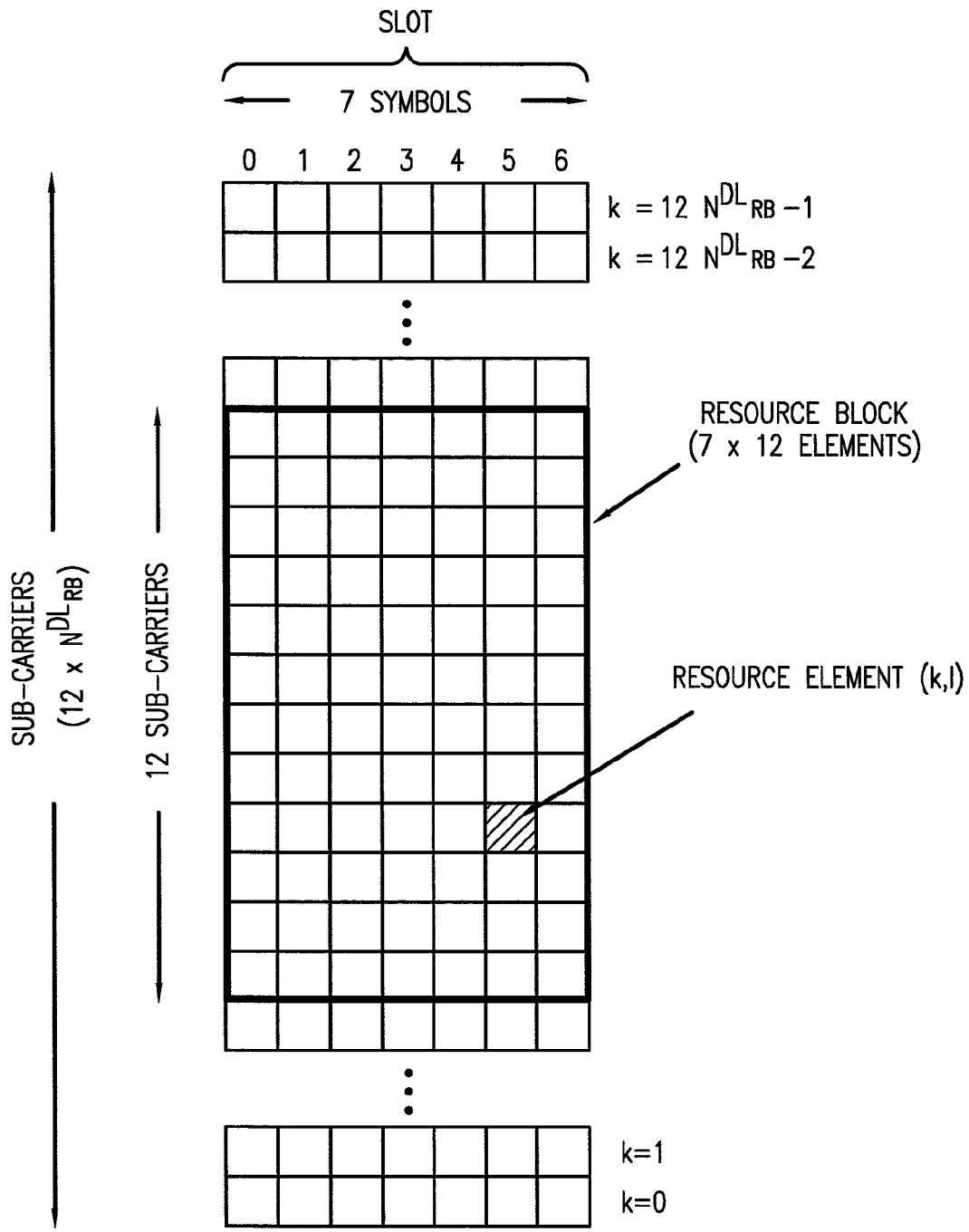

FIG. 4 is a schematic drawing of a resource grid, resource blocks, and resource elements for a LTE down-link transmitter.

Figure 5:
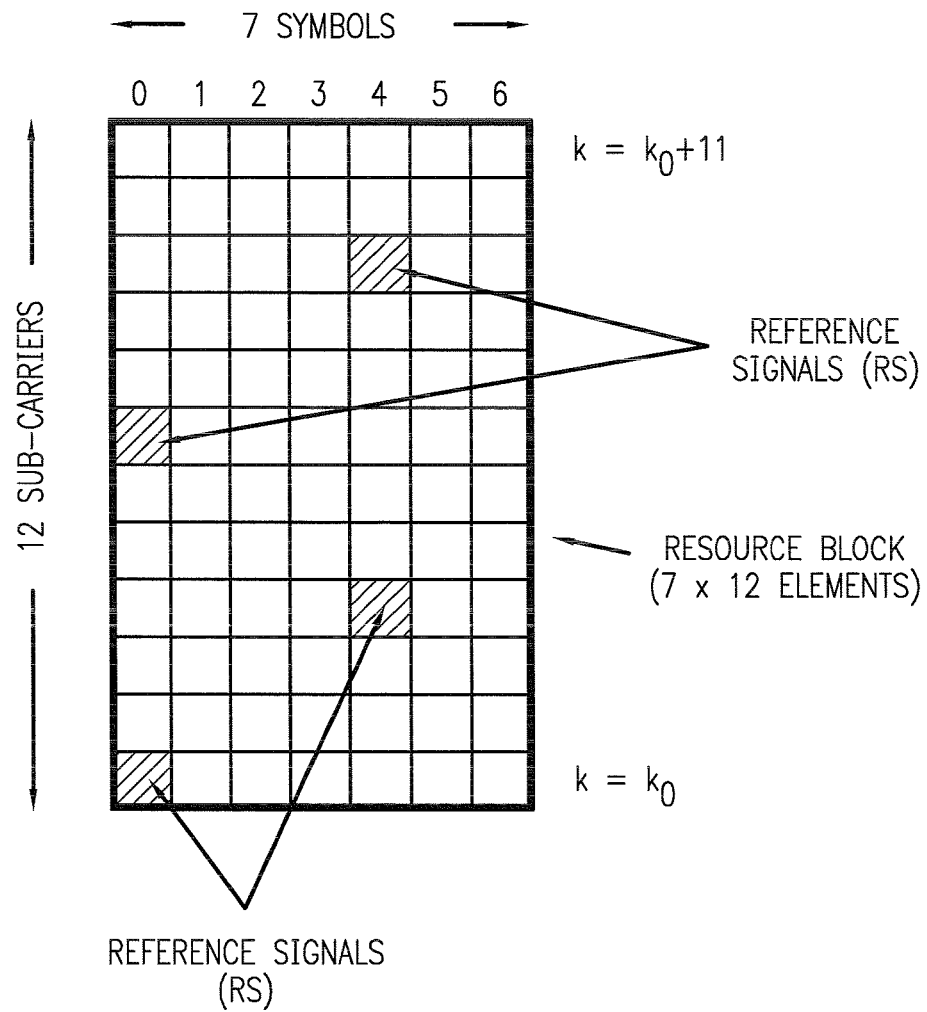

FIG. 5 is a schematic drawing of reference signal locations within each resource block for a for a LTE down-link transmitter.

Figure 6:
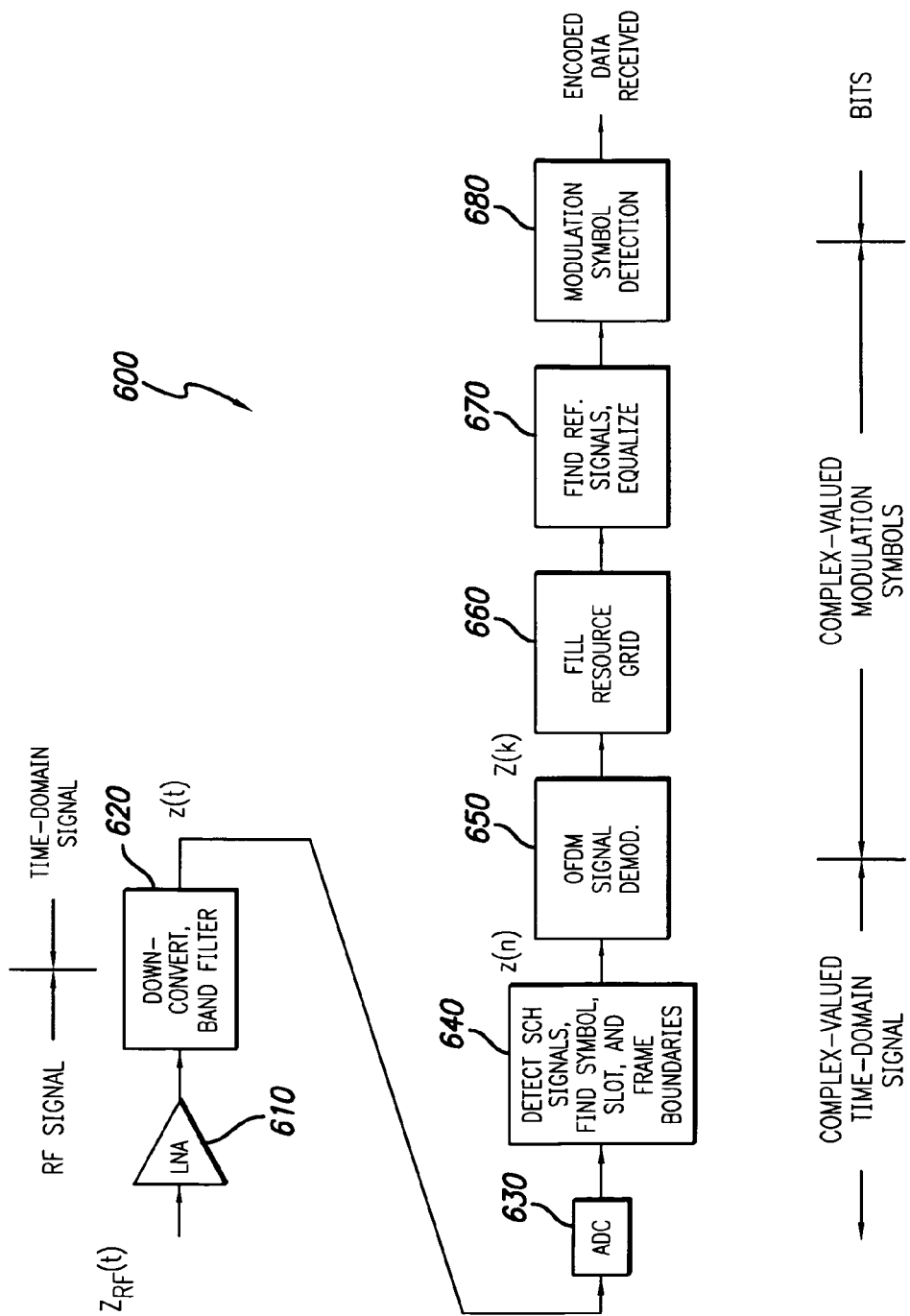

FIG. 6 is a schematic drawing of a LTE down-link receiver for a one antenna port system.

Figure 7:
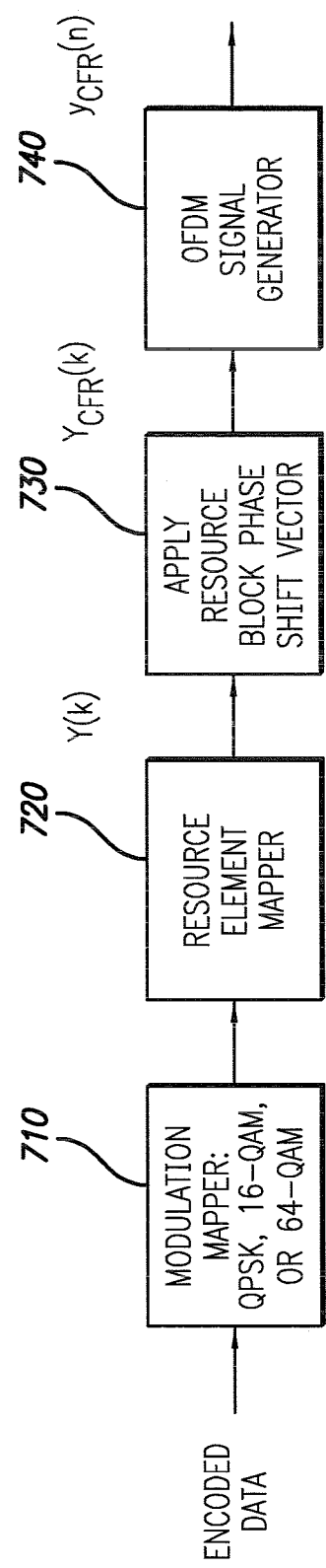

FIG. 7 is a schematic drawing of the baseband section of an LTE down-link transmitter with crest factor reduction for a one antenna port system in accordance with the present invention.

Figure 8:
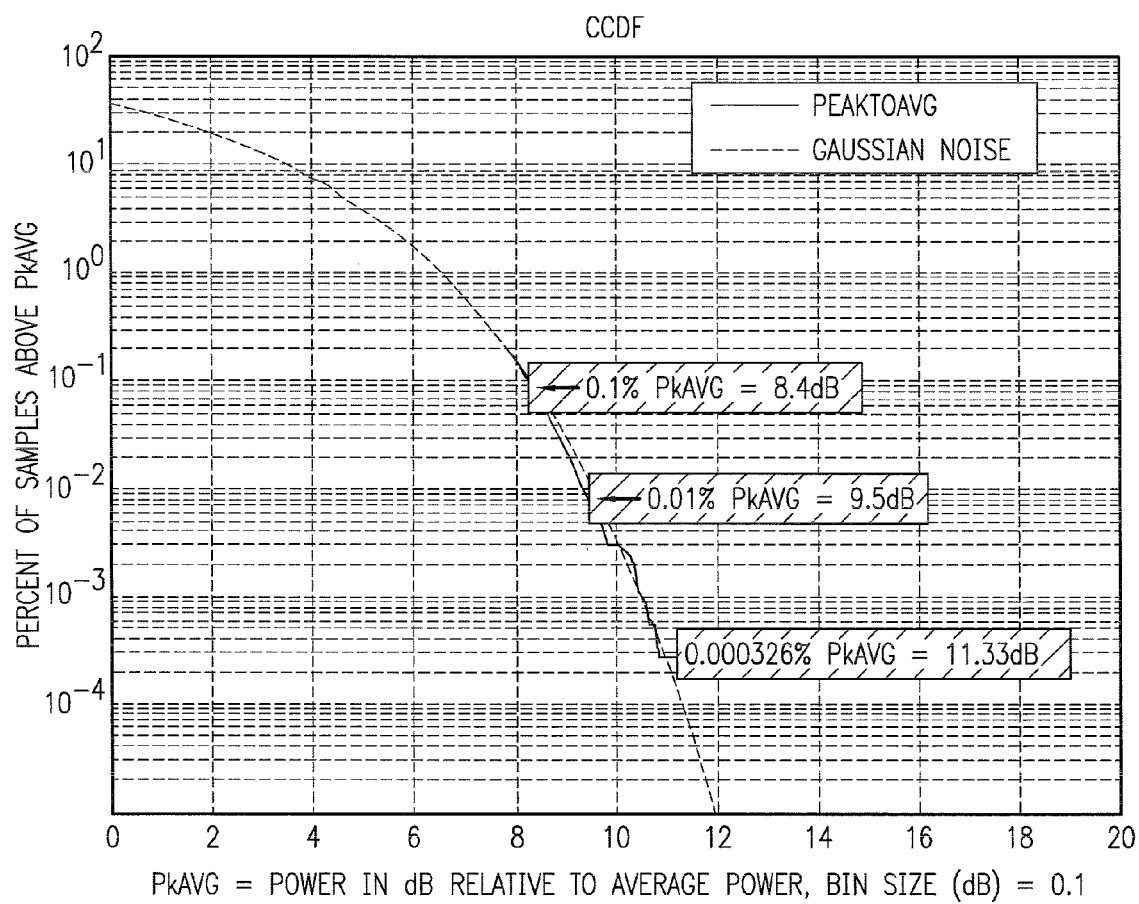

FIG. 8 is a schematic drawing of a simulation of the complimentary cumulative density function (CCDF) of a 10 MHz bandwidth down-link LTE waveform without CFR. (Note that the CCDF of the LTE waveform is similar to that of Gaussian noise.)

Figure 9:
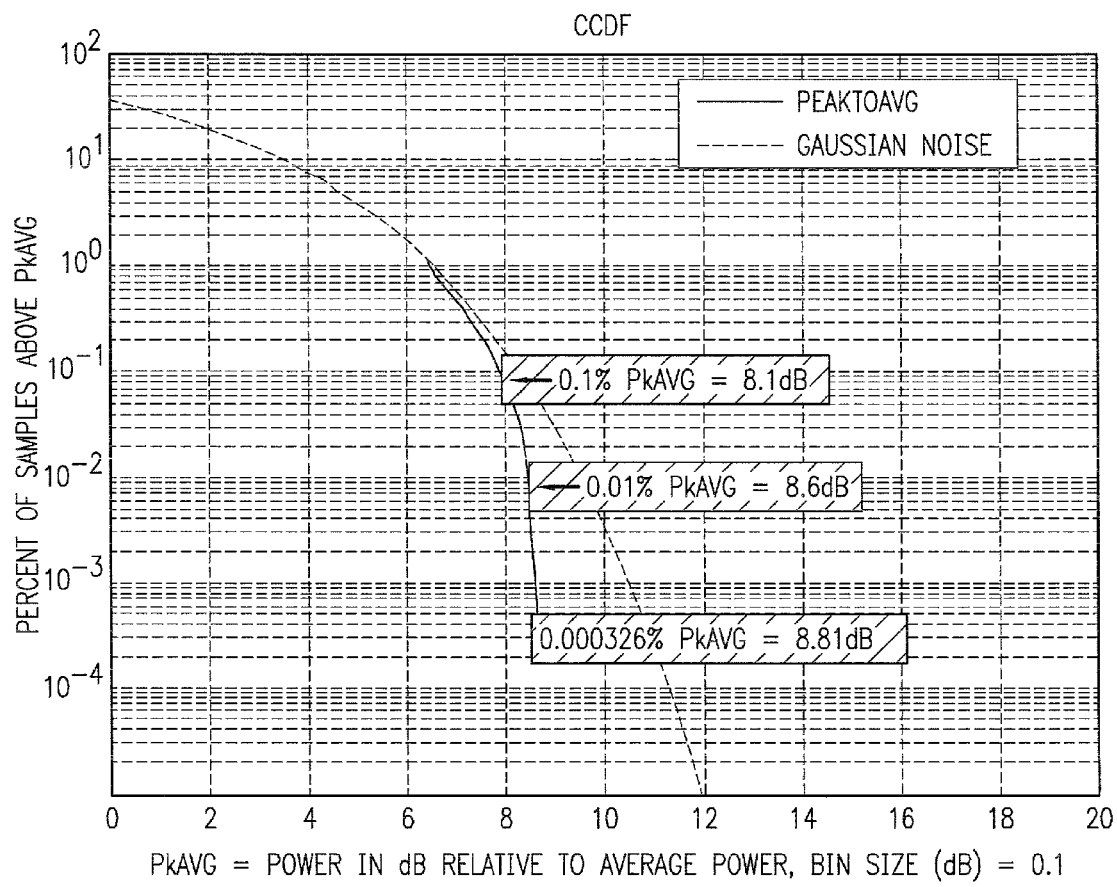

FIG. 9 is a schematic drawing of a simulation of the complimentary cumulative density function (CCDF) of the 10 MHz bandwidth down-link LTE waveform with the baseline CFR using the neighborhood gradient search. (Note that the peak response is reduced by 2.5 dB.)

Figure 10:
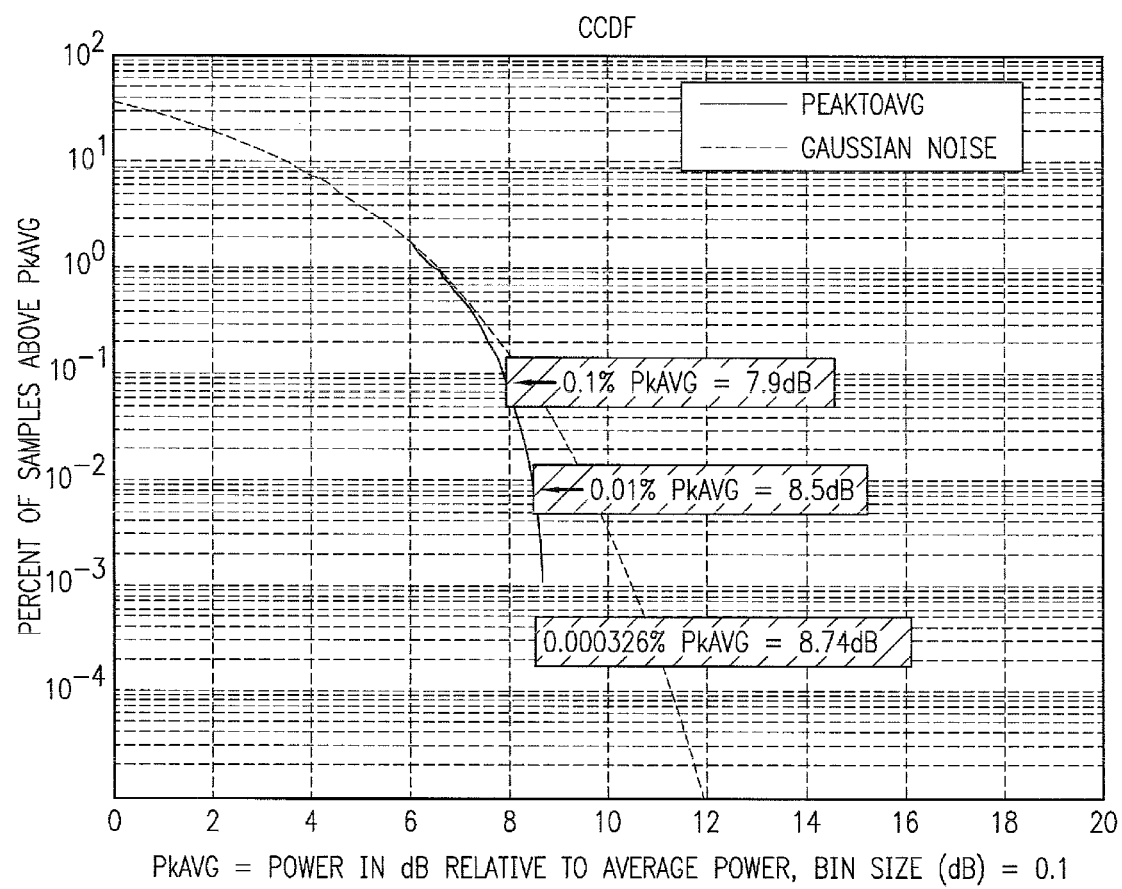

FIG. 10 is a schematic drawing of a simulation of a complimentary cumulative density function (CCDF) of the 10 MHz bandwidth down-link LTE waveform with the CFR using an alternate search algorithm. (Note that the peak response is reduced by 2.6 dB.)

DETAILED DESCRIPTION OF THE INVENTION

In a preferred embodiment, the present invention is implemented in a communication system employing the LTE downlink standard. Accordingly, first relevant details of the LTE downlink waveform will be described. The down-link waveform used in LTE is based on an OFDM format which, like most OFDM waveforms, can have a large peak-to-average power ratio (PAPR). Crest factor reduction (CFR) is an approach that reduces the waveform peaks without generating spectral regrowth outside of the allocated signal bandwidth. Usually crest factor reduction introduces in-band errors that increase the error vector magnitude (EVM) and bit error rate (BER) of the demodulated signal at the receiver. In contrast the disclosed approach exploits characteristics of the LTE modulation and demodulation to transmit low PAPR waveforms, without spectral regrowth, that can be demodulated without increasing EVM or BER.

The down-link LTE waveform comprises time-frequency elements which carry digital information relating to data or control functions. Resource blocks are groups of time-frequency elements that span several symbols (typically 7) and 12 sub-carriers that are contiguous in time and frequency, respectively. Transmissions are allocated in discrete resource blocks. Resource blocks are also assigned several reference signals, or pilots, which the demodulator within the receiver uses to equalize the propagation effects of the RF channel connecting the transmitter and receiver. The reference signals allow the compensation of amplitude and phase shifts that are common to all elements within a given resource block.

More specifically, LTE is a wireless cellular standard that is part of the long-term evolution of UMTS and is described within the 3GPP specifications (www.3gpp.org), incorporated herein by reference. The downlink of LTE, comprises the communications link where data is transmitted from the base station (RS) and received by user equipment (UE). The modulation format used in downlink LTE is an OFDM format which uses the parallel transmission of several closely-spaced orthogonal sub-carriers (typically 15 kHz spacing) to achieve high data transfer rates. The modulation and demodulation of the downlink LTE waveform are discussed below.

The LTE waveform comprises several downlink channels and physical signals. The key downlink channels include the PDSCH (physical downlink shared channel which contains the payload data), the PDCCH (physical downlink control channel), and the PBCH (physical broadcast channel). The physical signals include the reference signals (RS) which are pilot signals, P-SCH (primary synchronization channel), and S-SCH (secondary synchronization channel).

The generation of the LTE waveform is shown in FIGS. 1-5 for the case of a system 100 (FIG. 1) with one antenna port. The input comprises data and control signals associated with the downlink channels (PDSCH, PDCCH, PBCH, and others). These are provided to modulation mapper 110. Encoded data sequences from the PDSCH are modulated using QPSK, 16QAM, or 64QAM (IQ constellations shown in FIG. 2); encoded data sequences from PDCCH and PBCH are modulated using QPSK. The modulated data sequences are mapped to the available resource elements, which are time-frequency units spanning one symbol on one sub-carrier at block 120. Physical signals (RS, P-SCH, S-SCH) are also mapped to resources elements. The OFDM baseband signal is generated by mapping the resource elements onto sub-carriers and inverse Fourier transforming the set of sub-carriers for a given symbol creating a serial time sequence at OFDM signal generator 130. A cyclic prefix (CP) is added to each symbol sequence. Several CP-extended symbols (typically 7) are grouped to form a slot, two adjacent slots are grouped to form a sub-frame, and 10 contiguous sub-frames are grouped to form a frame. The FS1 frame structure for the downlink is shown in FIG. 3 and indicates how the key channels and the synchronization signals are placed over time and frequency (reference signals have been omitted in FIG. 3 for clarity). The frame is converted into an analog signal at DAC 140, filtered, up-converted to RF at block 150, amplified by PA (power amplifier) 160 and transmitted.

The mapping of modulated data and reference signals is based on resource blocks, which are groups of resource elements that span one slot width of symbols (typically 7 symbols) and 12 sub-carriers that are contiguous in time and frequency, respectively. The downlink resource grid, shown in FIG. 4, comprises all of resource blocks within a slot. The number of resource blocks per slot (denoted by $N^{DL}_{RB}$) varies with the bandwidth available for transmission (6, 15, 25, 50, 75, and 100 resource blocks per slot for 1.4 MHz, 3.0 MHz, 5 MHz, 10 MHz, 15 MHz, and 20 MHz bandwidths, respectively).

The reference signals are distributed evenly over time and frequency within the resource block. The location of the four reference signals in a resource block for a one antenna port system is shown in FIG. 5. Reference signals are pilots used by the demodulator within the receiver to equalize the propagation effects of the RF channel connecting the transmitter and receiver. The reference signals allow the compensation of amplitude and phase shifts that are common to all elements within a given resource block.

The demodulation of the down-link LTE waveform at the receiver 600 is shown in FIG. 6, for the case of a single antenna port system. The incoming RF waveform is amplified at LNA (low noise amplifier) 610, down-converted and filtered at block 620, and digitized at ADC (analog-to-digital converter) 630 as in any digital receiver. The digitized sequence is searched for the synchronization channel signals, P-SCH and S-SCH, from which the boundaries of the symbols, slots, and frames are determined at block 640. The time sequence corresponding to a symbol is extracted, the cyclic prefix is removed, and the remaining samples are Fourier transformed to create complex-valued modulation symbols. The symbols from a common slot are mapped into a resource grid and the reference signals are identified and demodulated at blocks 650 and 660. The frequency response of the RF channel (amplitude and phase shifts) at each reference signal is computed and the frequency responses of other resource elements are estimated by interpolating the amplitude and phase shifts from neighboring reference signals at block 670. The inverse frequency response is applied to each resource element, thereby equalizing the modulation symbols. A detector 680 is applied to convert the complex-valued modulation symbols (QPSK, 16QAM, or 64QAM) into an estimate of the encoded data bits originally transmitted. Differences between the transmitted and received data bits are bit errors and the rate at which they occur is the bit error rate (BER). The RMS difference between the received complex-value modulation symbols (before the detector) and the correct complex-value within the IQ constellation (QPSK, 16QAM, or 64QAM) is the error vector magnitude (EVM).

The implementation of the equalization of the modulation symbols is important for understanding the crest factor reduction approach disclosed herein. There are several ways to interpolate between reference signals. It is possible to interpolate using reference signals from several resource blocks spanning neighboring slots across all sub-carriers. In such cases the estimated frequency response will be continuous in both time and frequency. An alternative is to interpolate using reference signals from several resource blocks spanning one slot across all sub-carriers. The estimated frequency response will be continuous across frequency but may have discontinuities at the slot boundaries. The final choice is to use only the reference signals within a given resource block to estimate the frequency response which may result in discontinuities at the resource block boundaries.

Using only the reference signals from a given resource block has the advantage of being the easiest implementation but the equalization may be degraded slightly for resource elements near the resource block boundaries. However, it is shown in the next section that equalizing each resource block independently allows the disclosed crest factor reduction approach to be implemented without altering the LTE down-link receiver or degrading its performance in terms of EVM and BER.

Some equalizer implementations filter the reference signals over time and frequency to reduce noise before interpolating, using the assumption that the frequency response of the channel propagation is stationary over the duration of the frame and varies smoothly across the frequency band (see Annex E of 3GPP TS 36.104 V8.2.0 for an example). Such smoothing can not be applied directly when CFR has phase shifted the resource blocks independently. However, the four reference signals within the resource block can be fit to the above-mentioned model to compute the mean coefficient $Z_{ave}$ and the partial derivative with respect to frequency ($\delta Z/\delta k$). That is, we wish find $Z_{ave}$ and $\delta Z/\delta k$ that minimizes $$J = \sum_{k,l \in RS(n)} |\varepsilon(b)|^2 \qquad \text{(Eq. 1)}$$

where RS(b) is the set of elements containing reference signals in resource block b, $$\varepsilon(b) = Z_{RS}(k, l) - \left[ Z_{ave}(b) + (k - k_0) \cdot \frac{\partial Z}{\partial k}(b) \right] \qquad \text{(Eq. 2)}$$

and $Z_{RS}(k,l)$ denotes a resource signal, $k_0=12*n$, $k_0 \leq k \leq k_0 11$, and $l=0$ or 4.

The estimates of $Z_{ave}(b)$ and $\delta Z/\delta k(b)$ can be improved after an initial application the equalizer by measuring for systematic constellation errors associated with the 80 data-carrying elements within the resource block. This residual error can be used to improve the equalizer coefficients, reducing both the EVM and BER associated with noisy reference signals, In accordance with a preferred embodiment of the invention crest factor reduction (CFR) of a down-link LTE waveform employs shifting the phase of resource blocks so that the peak signal is reduced. The set of phase shifts applied to the individual resource blocks is referred to as the "phase shift vector." The baseband section of the LTE transmitter with crest factor reduction, for the case of a one antenna port system, is shown in FIG. 7. Blocks 710, 720 and 740 operate as in the system of FIG. 1. Block 730 determines the CFR phase shift vector and applies it of the LTE resource blocks.

The disclosed method is similar to PTS and SLM in the sense that the sub-carrier phases are altered to reduce the signal peaks. However, the phase shifts are applied to resource blocks instead of individual sub-carriers. It is unnecessary to send explicitly the phase shift vector to the receiver when resource blocks are equalized independently, as discussed earlier. This is due to the fact that the resource block phase shifts affect all elements within the resource block, including the reference signals, equally. Thus, the equalization at the receiver makes the subsequent detection insensitive to resource block phase shifts. This characteristic of the down-link LTE transmission and reception is exploited to achieve crest factor reduction without increasing the EVM or BER.

In its broadest form, the disclosed CFR method introduces amplitude and phase shifts to resource blocks to minimize the peak to average power ratio (PAPR). However, for the larger signal bandwidths the number of resource blocks is large (for example, 10 MHz bandwidth uses 50 resource blocks) making the search for the optimal CFR challenging. Fortunately, it is not necessary to find the optimal CFR. Instead it is sufficient to meet a target value for the crest factor.

To reduce the search space, the typical implementation of the disclosed CFR applies phase shifts, but not amplitude shifts, to the resource blocks to reach a target PAPR. The search space is reduced further, typically, by limiting the phase shifts to binary options of 0 or π radians, as in algorithm 1 listed below. With these restrictions the set of possible phase shift vectors becomes finite allowing an exhaustive search for the optimal value. However, exhaustive searches are rarely practical so more efficient algorithms that yield sub-optimal, but adequate, CFR performance are desired. Note for the LTE case it is not necessary to phase shift more than half of the available resource blocks. For example, phase shifting all of the resource blocks by π radians produces the same crest factor as phase shifting all of the block by 0 radians. This duality reduces the search space by half.

An alternative reduction of the search space, used in algorithm 3, is to limit the phase shift options to $\Delta\theta$, $-\Delta\theta$, or 0 radians, where $|\Delta\theta|$ is a small angle. It is believed that this type of search has not been pursued in the past. It is most effective when the number of resource blocks per slot, $N^{DL}_{RB}$, is large.

The search for an adequate resource block phase shift vector must exclude certain choices to allow the LTE receiver to demodulate the CFR waveform reliably. Resource blocks overlapping the synchronization signals, P-SCH and S-SCH, should not be phase shifted. Independently phase shifting resource blocks overlapping P-SCH and S-SCH will corrupt the synchronization signal and has the potential to prevent the identification of the frame, slot, and symbol boundaries.

Algorithm 1

The baseline search method for determining the potential of the CFR approach involves multiple linear searches. The first pass of the search introduces a phase shift of π radians to one resource block only. The phase shift is applied to each resource block successively until the PAPR is below the target value. If all of the resource blocks are tested without reaching the target, the phase shift vector resulting in the best PAPR is retained. The search is repeated using the partially CFR'ed waveform as the input, which introduces a second phase shifted resource block. Each subsequent search introduces an additional phase shifted resource block. After each of the search iterations, the target PAPR is increased to ensure the search will terminate. The search may also terminate before reaching the target PAPR if the most recent iteration did not reduce the PAPR. This search method is similar to neighborhood gradient search disclosed in S. H. Han and J. H. Lee, "PAPR reduction of OFDM signals using a reduced complexity PTS technique," IEEE Signal Processing Letters, vol. 10, no. 11, pp. 887-890, November 2004, (incorporated by reference herein in its entirety) for the case where the Hamming distance between the current and the set of possible updated phase-shift vectors is equal to one. The complexity of any search is related to the number of IFFT/FFT's performed per symbol to find an acceptable phase shift vector. The complexity of this sub-optimal PTS search for a Hamming distance of one is $N^{DL}_{RB} {}^* N_{iter}$ (number of resource blocks per slot times the number of iterations). Another sub-optimal PTS search is the iterative flipping algorithm used in L. J. Cimini Jr. and N. R. Sollenberger, "Peak-toaverage power ratio reduction of an OFDM signal using partial transmit sequences," IEEE Communications Letters, vol. 4, pp. 86-88, March 2000, (incorporated by reference herein in its entirety) which flips the phase shift of individual sub-carrier blocks in sequential order if the phase shift lowers the PAPR. The complexity of the search is $N^{DL}_{RB}$, but the PAPR is performance worse on average than the neighborhood gradient search. The complexity of both the neighborhood gradient and iterative flipping algorithm is reduced when a target PAPR threshold is used that causes the search to terminate early.

Algorithm 2

An alternative search method is to perform an exhaustive search on a restricted set of phase shift vectors. For example, a set of four phase shift vectors could be defined and the vector resulting in the lowest PAPR would be selected for transmission. This method is equivalent to SLM, such as the one described in C-. L. Wang and Y. Ouyang, "Low-complexity selected mapping schemes for peak-to-average power ratio reduction in OFDM systems," IEEE Trans. Signal Processing, vol. 53, no. 12, pp. 4652-4660, December 2005, (incorporated by reference herein in its entirety). The complexity of the search per symbol is related to the number of phase shift vectors in the set. The PAPR performance is worse on average than the neighborhood gradient search.

Algorithm 3

It is preferable to use a search method that creates the phase shift vector in fewer IFFT/FFT computations. A potential method is to extract the peaks from the original time domain signal (after the IFFT) and attempt to correlate the peaks with the complex-valued modulation symbols within the resource grid. The peak extracted complex-value time signal, denoted by $y_{peaks}(n)$, is defined by $$y_{peaks}(n) = \begin{cases} y(n) - \lambda \cdot \frac{y(n)}{|y(n)|} & \text{for } |y(n)| > \lambda \\ 0 & \text{otherwise.} \end{cases} \quad \text{(Eq. 3)}$$

where $\lambda$ is a clipping threshold. A FFT is applied to the peak extracted signal to obtain the corresponding complex-valued modulation symbols:

$$Y_{peaks}(k,l) = FFT\{y_{peaks}(n)\} \quad \text{(Eq. 4)}$$

where the indices k and l indicate the sub-carrier and symbol positions within the resource grid. The modulation symbols of the original and peak extracted signals are cross-correlated:

$$C(k,l) = Y(k,l) \cdot Y_{peak}^*(k,l). \quad \text{(Eq. 5)}$$

The process of creating the time domain signal y(n), determining the peak extracted signal $y_{peaks}(n)$, and its Fourier transform is repeated for each symbol interval within the resource grid (l=[0,6]).

The phase shifts used for CFR are determined as follows. Compute the cross-correlation for the sub-carriers within resource block b for symbol l:

$$C_{RB}(b) = \sum_{l=0}^{6} \sum_{k=k_o}^{k_o+11} C(k,l) \quad \text{(Eq. 6)}$$

where $k_o = 12 \, b$. A phase shift $\theta(b)$ is introduced such that $$\theta(b) = \begin{cases} |\Delta\theta| \cdot \text{sgn}(\text{Im}\{C_{RB}(b)\}) & \text{for } \text{Re}\{C_{RB}(b)\} > 0 \\ 0 & \text{otherwise} \end{cases} \quad \text{(Eq. 7)}$$

where $|\Delta\theta|$ is a small angle.

The method starts by making the signal-under-test equal to the original signal. The PAPR is computed. If the PAPR is below the target value, the signal-under-test is transmitted without modification. If the PAPR is too large, the initial value of $\Delta\theta$ is selected. The phase shift vector obtained by applying (Eq. 3) through (Eq. 7) is used to phase shift the resource blocks. The phase-shifted signal is generated and the PAPR is computed. If the PAPR is worse, the phase increment $\Delta\theta$ is reduced. The phase-shifted signal becomes the signal-under-test and the process is repeated until the PAPR is below the target value or until the maximum number of iterations is reached. If the maximum number of iterations is reached, the phase shift vector producing the lowest PAPR of those tested is transmitted.

This method differs from the baseline (neighborhood gradient search) algorithm in that the phase shifts used during a given iteration are much smaller than $\pi$ radians ($|\Delta\theta|=0.05\pi$ radians for the 10 MHz bandwidth case in the example below).

The complexity of the search for the phase shift vector, in terms of IFFT/FFT's, is $2*N_{iter}+1$ per symbol where $N_{iter}$ is the number of iterations ($N_{iter}=3$ in the example below).

The CFR approach has been tested below to determine the performance potential. The baseband portions of the down-link LTE transmitter and receiver are implemented in Matlab. The PDSCH is random data modulated using 64QAM. The PDCCH and PBCH are random data modulated using QPSK. The physical channels—reference signals, P-SCH, S-SCH—are modulated as detailed in the 3GPP TS 36.211 V8.3.0 specification ($N^{cell}_{ID}=0$, $N^{(1)}_{ID}=0$, $N^{(2)}_{ID}=0$). The neighborhood gradient search mentioned earlier with binary phase shifts (0 or $\pi$ radians) is used as the baseline method for judging the performance of the resource block phase shift vector selection. The target CFR for early termination of the search is set to 8 dB.

The complimentary cumulative density functions (CCDF's) of the down-link LTE waveform, without CFR, with the baseline CFR, and with algorithm 3 CFR, are shown in FIG. 8, FIG. 9, and FIG. 10, respectively. The bandwidth of the signal is 10 MHz, which contains 50 resource blocks that may be phase shifted independently. The original waveform, without CFR, has a CCDF similar to Gaussian noise. In contrast, the CCDF for the waveform with the baseline CFR applied is more favorable in the sense that the peak is reduced from 11.3 dB to 8.8 dB. The neighborhood gradient search was terminated when phase shifting an additional resource block did not lower the PAPR further or when the PAPR dropped below 8 dB. The number of resource blocks phase shifted by $\pi$ radians (per slot) varied from 2 to 7, with a mean of 4.2, for the case of 50 available resource blocks. The average complexity is 210 (4.2*50) IFFT computations per symbol, which is too large to be practical.

The CFR using algorithm 3 performed slightly better than the baseline performance, reducing the peak to 8.7 dB. The initial phase increment $\Delta\theta$ was set to $0.057\pi$ radians and decreased by a factor of 0.5 when necessary. The maximum number of iterations was set to $N_{iter}=3$. The computational complexity of algorithm 3 in terms of IFFT/FFT computations is 7 per symbol, which is significantly better than the baseline search algorithm. The CFR can be improved further by increasing $N_{iter}$ and lowering the target CFR.

The foregoing description of a preferred embodiment of the invention is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for reducing peak to average power in an orthogonal frequency division multiplex (ODFM) wireless transmission system, comprising:
   receiving an ODFM signal to be transmitted, the signal being grouped into resource blocks having plural OFDM symbol intervals, wherein each resource block includes a reference signal;
   selectively determining a phase shift for individual resource blocks to reduce the peak to average power of the modulated signal; and
   applying the phase shifts to individual resource blocks;
   wherein selectively determining a phase shift comprises limiting the number of possible phase shifts to reduce the search space and performing an optimization search of the reduced search space to determine a desired phase shift; and
   wherein the search employs a target Peak to Average Power Ratio (PAPR) and a phase shift is applied to each resource block successively until the PAPR is below the target value.

2. The method of claim 1, wherein possible phase shifts are limited to the values 0 and $\pi$ radians.

3. The method of claim 1, wherein phase shifts are applied to only one half of the resource blocks.

4. The method of claim 1, wherein the OFDM signal includes synchronization signals and wherein phase shifts are not applied to resource blocks overlapping the synchronization signals.

5. The method of claim 1, wherein the optimization search limits the phase shift options to $\Delta\theta$, $-\Delta\theta$, or 0 radians, where $|\Delta\theta|$ is a small angle.

6. The method of claim 1, wherein the optimization search involves multiple linear searches and each search introduces a phase shift of it radians to one resource block only.

7. The method of claim 1, wherein if all of the resource blocks are tested without reaching the target PAPR, the phase shift vector resulting in the best PAPR is retained.

8. The method of claim 1, wherein the search is repeated using the partially phase shifted waveform as the input, which introduces a second phase shifted resource block, and wherein each subsequent search introduces an additional phase shifted resource block.

9. The method of claim 1, wherein after each of the search iterations, the target PAPR is increased to ensure the search will terminate.

10. The method of claim 1, wherein the optimization search performs an exhaustive search on a restricted set of phase shift vectors.

11. The method of claim 10, wherein a set of four phase shift vectors are defined and the vector resulting in the lowest Peak to Average Power Ratio is selected.

12. The method of claim 1, wherein the OFDM signal is shifted between time and frequency domains and the optimization search extracts the peaks from the original time domain signal and correlates the peaks with the complex-valued modulation symbols.

* * * * *